United States Patent
Hengster

(10) Patent No.: US 8,850,850 B2
(45) Date of Patent: Oct. 7, 2014

(54) MENISCUS LENS OF SYNTHETIC QUARTZ GLASS AND METHOD FOR THE PRODUCTION THEREOF

(75) Inventor: Stefan Hengster, Frankfurt (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 341 days.

(21) Appl. No.: 13/384,334

(22) PCT Filed: Jul. 1, 2010

(86) PCT No.: PCT/EP2010/059340
§ 371 (c)(1),
(2), (4) Date: Mar. 19, 2012

(87) PCT Pub. No.: WO2011/006759
PCT Pub. Date: Jan. 20, 2011

(65) Prior Publication Data
US 2012/0170131 A1    Jul. 5, 2012

(30) Foreign Application Priority Data
Jul. 15, 2009   (DE) .......................... 10 2009 033 497

(51) Int. Cl.
*C03B 11/08*    (2006.01)
*C03B 17/00*    (2006.01)

(52) U.S. Cl.
USPC .......... 65/37; 65/39; 65/47; 65/60.1; 65/60.5; 65/60.8; 65/61; 65/102; 65/103; 65/106; 65/273

(58) Field of Classification Search
USPC .......... 65/30.1, 36–39, 45–47, 53, 60.1, 60.5, 65/60.51–60.53, 60.8, 61, 90, 93, 98, 102, 65/103, 106, 113, 120, 111, 269, 273, 285, 65/275, 281, 284; 359/642, 737, 741, 359/796–797

See application file for complete search history.

(56) References Cited

U.S. PATENT DOCUMENTS 5,236,486 A    8/1993    Blankenbecler et al.
5,790,315 A    8/1998    Fujinoki et al.
(Continued)

FOREIGN PATENT DOCUMENTS

| EP | 0673888 A1 | 9/1995 |
| EP | 0735006 A1 | 10/1996 |
| EP | 1081106 A1 | 3/2001 |
| WO | 0232622 A | 4/2002 |

*Primary Examiner* — Evelyn A. Lester
(74) *Attorney, Agent, or Firm* — Tiajoloff and Kelly LLP

(57) ABSTRACT

To produce a meniscus lens from synthetic quartz glass for use in a microlithography apparatus, which lens has a first optical surface (7) and a second optical surface (8) with the same direction of curvature as the first optical surface (7), SiO2 particles are formed by oxidation or flame hydrolysis of a silicon-containing starting compound and deposited layer by layer on a substrate to form a cylindrical SiO2 blank which contains layers with a surface normal extending in the direction of growth. To allow such layers, which have however the least possible adverse effect on optical or mechanical properties, it is proposed according to the invention that the blank is plastically worked in a hot forming process under the effect of a deforming force to form a preform (6), which has at least the first curved surface (7) and in which the layers are curved in the direction of curvature, and that the meniscus lens is obtained from the preform.

8 Claims, 1 Drawing Sheet

(56) References Cited

U.S. PATENT DOCUMENTS

Figure 1:
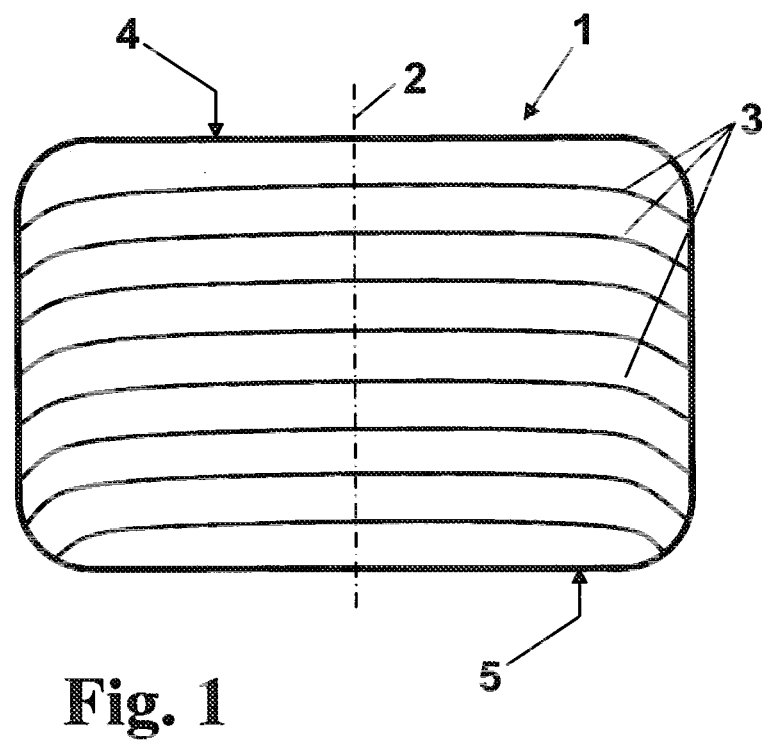

| | | |
|---|---|---|
| 6,189,339 B1 | 2/2001 | Hiraiwa |
| 6,587,262 B1 | 7/2003 | Fujiwara et al. |
| 7,312,170 B2 * | 12/2007 | Nishimura et al. ............ 65/30.1 |
| 7,786,203 B2 | 8/2010 | Hanssen et al. |
| 2002/0043080 A1 | 4/2002 | Best et al. |
| 2007/0066733 A1 | 3/2007 | Hanssen et al. |

* cited by examiner

MENISCUS LENS OF SYNTHETIC QUARTZ GLASS AND METHOD FOR THE PRODUCTION THEREOF

DESCRIPTION

The present invention relates to a meniscus lens of synthetic quartz glass for use in a microlithography apparatus, which lens comprises a first optical surface and a second optical surface with the same direction of curvature as the first optical surface.

Furthermore, the present invention relates to a method for producing a meniscus lens from synthetic quartz glass for use in a microlithography apparatus, which lens comprises a first optical surface and a second optical surface with the same direction of curvature as the first optical surface, the method comprising a step in which $SiO_2$ particles are formed by oxidation or flame hydrolysis of a silicon-containing starting compound and deposited layer by layer on a substrate to form a cylindrical $SiO_2$ blank which contains layers with a surface normal extending in the growing direction.

PRIOR ART

A meniscus lens has a convex, optically effective lens surface and, opposite thereto, a concave, optically effective lens surface. Both lens surfaces exhibit different optical effects, but are curved in the same direction. This direction is here called "direction of curvature".

Methods for producing synthetic quartz glass by oxidation or flame hydrolysis of silicon-containing starting substances are generally known under the names VAD (Vapor Phase Axial Deposition) methods, OVD (Outside Vapor Phase Deposition) methods and PCVD (or also PECVD; Plasma Enhanced Chemical Vapor Deposition) methods. As a rule, $SiO_2$ particles are produced by means of a deposition burner and deposited layer by layer on a substrate. At an adequately high temperature in the area of the substrate surface, direct vitrification of the $SiO_2$ particles will take place ("direct vitrification"). By contrast, in the so-called "soot method" the temperature is so low during deposition of the $SiO_2$ particles that a porous soot layer is obtained that is sintered in a separate method step into transparent quartz glass. Both the direct vitrification and the soot method produce a dense, transparent, synthetic quartz glass of high purity.

It is known that due to the layerwise deposition of the $SiO_2$ particles it is very difficult even with the greatest care to avoid layer-shaped inhomogeneities in the quartz glass. Such inhomogeneities are caused by temperature variations or changes in the chemical composition or the density of the quartz glass during the deposition process.

The quartz glass blanks which contain layers and are shaped in the form of rods, blocks, tubes or plates are further processed into optical components, such as lenses, windows, filters, mask plates, or the like, particularly for optical components for transmitting high-energy ultraviolet radiation in exposure and projection optics in microlithography apparatus. The exposure and projection systems of modern microlithography apparatus are equipped with excimer lasers that emit high-energy pulsed UV radiation of a wavelength of 248 nm (krF laser= or of 193 nm (ArF laser). With such microlithographic projection exposure systems there is the general demand that a light distribution provided in the area of a pupil plane of the illumination system should be transmitted as homogeneously and angle-maintaining as possible into a pupil plane of the projection lens conjugated relative to the pupil plane of the illumination system. Every change in the angle spectrum produced in the optical path leads to a distortion of the intensity distribution in the lens pupil, which leads to an asymmetrical irradiation and thus to a deterioration of the imaging performance.

The optical projection or exposure system comprises a multitude of optical elements, particularly lenses. Even with a small change in the transmission or the optical imaging in an individual lens, this effect adds up over the total of the lenses of the system and reduces its accurate image reproduction and transmission.

In this connection the aforementioned layers play an important role because these can change the imaging properties of optical components of quartz glass. Therefore, as a rule, the aim is a quartz glass that is as layer-free as possible by minimizing the formation of layers in the synthesis of the glass or by removing existing layers subsequently.

However, due to its layerwise production and the high viscosity of synthetic quartz glass, both the prevention of layers and their subsequent elimination require great efforts.

To avoid such efforts, EP 0 735 006 A1 suggests a biconvex lens of synthetic quartz glass for use in microlithography and a method for the production thereof, wherein layers are allowed that are planar. The lens containing the planar layers must be arranged with respect to the optical path of the optical system such that the layers extend substantially perpendicular to the optical axis. To achieve the desired planarity of the layers, two methods are suggested:

In the one method the attempt is made to produce plane-parallel layers already in the depositing process by means of the VAD method. Boundary areas that do not satisfy this condition are cut off, and the biconvex lens is formed by means of machining, i.e. by cutting, milling, polishing and honing out of the block or ingot obtained in this way, with layers extending in plane-parallel fashion.

In a second method, curved layer extensions are permitted in the manufacture of a quartz glass ingot by way of the VAD method. A cylindrical semifinished product is subsequently formed in a mechanical way from the quartz glass ingot, the semifinished product having faces shaped in parallel with the curved layers. The semifinished product is formed in a hot forming process into a cylindrical blank in the case of which the faces and the layers extend in plane-parallel fashion relative to the surface. The desired biconvex lens is again obtained from this lens by machining by way of cutting, milling, or grinding.

U.S. Pat. No. 5,236,486 A describes optical lenses consisting of soft glass that has profiles of refractive index gradients. The gradient profiles may be made spherical with axial and also radial components. They should permit a flexible lens design. The spherical refractive-index gradient profiles can be produced in that a starting body of the gradient glass is softened in a mold and thereby deformed, the deformation being possibly speeded up by pressure.

TECHNICAL OBJECTIVE

It is therefore the object of the present invention to provide a meniscus lens of synthetic quartz glass for use in microlithography, in which layers are allowed that have the least possible adverse effect on optical or mechanical properties.

Furthermore, it is the object of the present invention to indicate a suitable method for producing such a meniscus lens.

As for the method, this object starting from a method with the features of the aforementioned type is achieved according to the invention in that the blank is plastically worked in a hot forming process under the effect of a deforming force to form a preform, which has at least the first curved surface and in which the layers are curved in the direction of curvature, and that the meniscus lens is obtained from the preform.

In contrast to the prior art, plane-parallel layers are not allowed, but layers are allowed that extend in curved fashion in the direction of the optical surfaces, i.e. in the direction of curvature of the two optically effective surfaces of the meniscus lens. Layers extending in curved fashion in the direction of curvature have hardly any adverse effect on the optical imaging process and can even make a positive contribution.

It is here assumed that layers in the meniscus lens that extend perpendicular to the direction of the passing light exert no significant influence on the refraction and polarization of light. The smaller the deviation of the surface normal to the layers from the direction of the passing light is the smaller are the effects on light refraction and polarization.

The meniscus lenses are normally encased on the periphery. The lens surfaces which contribute to optical imaging are here defined as "optically effective surfaces", which in an extreme case is the whole visible lens surface up to the encasement.

According to the invention the layers that are present in the $SiO_2$ blank are deformed by a hot forming process in which the curved surface area of the optical component is produced, in such a manner that the layers in the preform obtained after the hot forming process follow the first curved surface. Of importance is here only the optically used surface area of the first curved surface which during the intended use of the lens contributes to optical imaging. This surface area is here also called "optical surface". In practice, one should endeavor that the layers following the curved surface do not intersect the same in the area of the optical surface or at best intersect it at an angle that is as acute as possible. The meniscus lens is obtained from the preform by removing a possible oversize and by mechanical finishing, such as grinding and polishing. The mechanical finishing operation may also include the production of the second curved surface of the meniscus lens which is opposite to the first curved surface. The mechanical finishing of the preform does not change the layer extension set previously.

The formation of the blank into the preform is carried out by means of a deforming force. The layers are here oriented such that the layer normals extend substantially in parallel with the direction of the deforming force. The method according to the invention therefore requires knowledge about the extension of the layers in the blank during the forming operation in the hot forming process.

The formation of the blank is carried out by means of a deforming force, such as gravity, which acts substantially in a direction perpendicular to the layers and in parallel with the layer normals in the blank. Optimally, the layer extension is also adapted to the second curved surface. Since in a meniscus lens both optical surfaces have the same direction of curvature as the layers, a certain adaptation is given at any rate. In cases where the degrees of curvature of the optical surfaces of the meniscus lens differ from each other, preferably the surface with the strongest curvature is regarded as the first curved surface. The layer extension is matched therewith as much as possible during the forming step.

In a first preferred method variant, it is intended that the hot forming process comprises a forming process in which the blank is accommodated in a lathe, softened and shaped without tools to obtain the preform.

Such a process is described in EP 673 888 A1 for the purpose of the complete removal of layers. In an intermediate step, however, a spherical quartz glass mass is obtained that still contains layers, namely with an orientation that follows the spherical surface at least in part.

In this case the second curved surface of the meniscus lens is preferably obtained by a press ram acting in the direction of the layer surface normal. This ram is optionally equipped with a convexly curved press surface. In another preferred method variant, it is intended that the hot forming process comprises a forming step in which the blank is accommodated by means of a blowpipe, softened and formed in a graphite mold to obtain the preform.

A glass melt is here gathered by means of a blowpipe, which may also be clamped in a lathe, and pressed by it into a mold that predetermines the external geometry of the first curved surface. The quartz glass mass is here heated up by means of a gas burner, such as an oxyhydrogen burner.

In a further preferred method variant, it is intended that the hot forming process comprises a forming step in which the blank is softened in a furnace and flows out into a graphite mold with formation of the preform.

The blank is here formed by softening a normally cylindrical blank in a furnace and by allowing the softened quartz glass mass to flow out into a mold solely by the action of gravity or of an additional force, e.g. by pressure or by an additional weight. To avoid an undefined deformation and reorientation of the layers, a laminar outflow of the quartz glass mass and a flow path that is as short as possible are desired. In this connection it has turned out to be useful when the graphite mold comprises an arched bottom side that produces the first curved surface, and that the second curved surface is produced by plastic preform by means of an arched body acting on the blank in the direction of the layer surface normal.

With the arched body acting on the softened blank, the second curved surface of the lens is preferably preformed at the same time. This is e.g. a press ram or a weight body resting on the blank, with respectively concave or convex curvature.

In practice, the aim should be that the layers following the curved surface do not intersect said surface in the area of the optical surface or at best intersect it at an angle that is as acute as possible. According to the invention this is at least true for the layer that is directly adjacent to the curved surface. Layers that intersect the first or second curved surface of the meniscus lens in the optically effective area are the more critical the more obtuse the angle is at which the layer intersects the curved optical surface.

Preferably, the surface normal to the layer adjacent to the first curved surface extends over its whole surface extension at an angle between 70° and 110° to the first curved surface, preferably at an angle between 80° and 100°.

In contrast to the known method, the method according to the invention yields layers that substantially follow the curvature of the surface at least in the neighboring area and therefore do either not meet the optically effective surface or at any rate not at an obtuse angle (of about 90 degrees).

The layers, particularly the layer which is next to the first curved surface, have a radius of curvature similar to that of the first curved surface. Thus ideally the layers do not at all intersect the lens surface in the optically curved portion, and in practice the layers nestle as much as possible against the first curved surface or extend in parallel therewith.

The greater the deviation of the surface normal to the direction of the passing light is the greater is the impact of the layer on the light beam. This impact consists e.g. in that the light beam is refracted or distorted and a possible polarization is changed.

Furthermore, a preform with a layer extension adapted to the first curved surface (and optimally also to the second curved surface) exhibits improved grindability in the optically effective surface area. This is due to the fact that this surface area is—ideally—not penetrated by any layer.

It has been found that this orientation of the layers ensures a comparatively small impairment of the light radiation transmitted by the optical component and leads to minor aberrations in an optical system containing such optical meniscus lenses.

In each of the above-explained method variants for forming the blank the orientation of the layers in the blank and the orientation of the blank in the forming process must be heeded.

As for the meniscus lens, the aforementioned object starting from a meniscus lens of the aforementioned type is achieved according to the invention in that it contains layers curved in the direction of curvature.

In the meniscus lens at least the layer adjacent to the first curved surface, and ideally all surfaces, extend in the same direction of curvature as the lens curvature of the first curved surface.

This means that the layers substantially follow the area of the curvature of the surface as much as possible over their whole surface extension. This orientation of the layers has a comparatively small adverse effect on the light radiation transmitted by the meniscus lens and results in minor aberrations, and it even makes a contribution to the imaging process.

The meniscus lens according to the invention is particularly well suited for use in an exposure or projection system of a microlithography apparatus.

Advantageous designs of the meniscus lens according to the invention follow from the sub-claims. As far as the designs of the meniscus lens indicated in the sub-claims copy the procedures indicated in sub-claims with respect to the method according to the invention, reference is made to the above statements on the corresponding method claims for supplementary explanation.

EMBODIMENT

The invention shall now be explained in more detail with reference to an embodiment.

Figure 2:
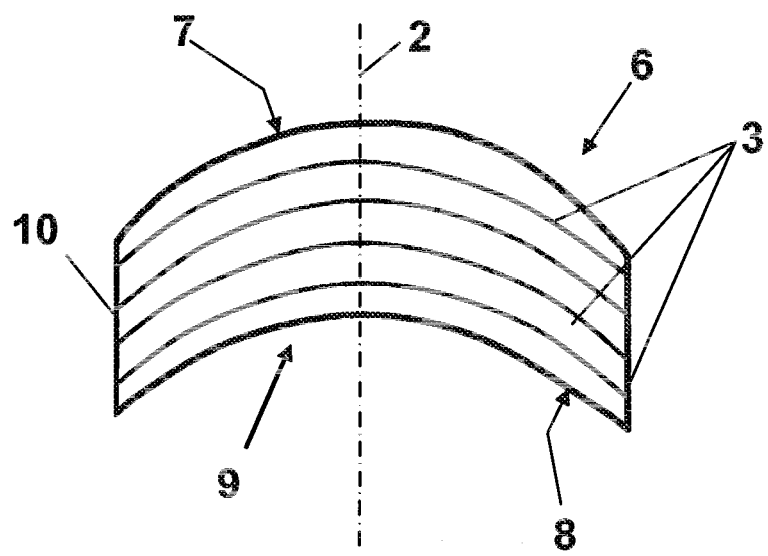

FIG. 1 shows a cylindrical blank of quartz glass which contains layers and is used for producing an optical lens, prior to shaping; and FIG. 2 shows the optical component obtained after shaping from the blank, in a schematic illustration.

$SiO_2$ particles are formed by flame hydrolysis of $SiCl_4$ in the burner flame of a deposition burner and are deposited layer by layer by means of the VAD method on a rotating substrate with formation of a SAD solid cylinder of porous $SiO_2$. The soot cylinder obtained in this way is processed by means of the generally customary vitrification processes into a quartz glass cylinder having an outer diameter of 300 mm and a height of 80 mm. This cylinder serves as a lens blank for a projection lens that is distinguished by high transparency in the short-wave UV range and by high UV radiation resistance and is suited for use in microlithography.

FIG. 1 shows the cylindrical quartz glass blank 1 in a section parallel to the longitudinal axis 2 of the cylinder. The quartz glass blank 1 has layers 3 extending substantially plane-parallel with the top side 4 and the bottom side 5 of the blank 1. The layer structure extends in the growing direction of the original VAD soot cylinder and perpendicular to the longitudinal axis 2.

The layers 3 are interferometrically visualized, so that their extension and orientation within the blank 1 prior to the further processing thereof are known.

The quartz glass blank 1 is subsequently formed with the help of a hot forming process into a preform for a meniscus lens with convex and concave surface. Examples of the forming process shall be explained in more detail hereinafter:

EXAMPLE 1

The quartz glass blank is gathered on a lathe by means of a blowpipe so that the surface normal to the layers extends in parallel with the longitudinal axis of the blowpipe. The blank is pressed into a graphite mold with outwardly arched bottom. The blank is here heated up by means of a gas burner to a temperature of about 2000° C. A first, convexly curved lens surface is produced by means of the graphite mold. The second, concavely curved surface is produced in that the blowpipe is removed and a graphite ram with a convex surface is pressed into the top side of the soft quartz melt.

A preform for a meniscus lens with a first, convexly curved lens surface and with a second, concavely curved surface is obtained.

EXAMPLE 2

The quartz glass blank 1 is put into a graphite mold and weighted down with a ram. The graphite mold has a concavely curved bottom and the ram has a convexly curved bottom side shaped as a spherical segment. Both parts consist of porous graphite of high purity. For the deformation the whole mold is heated up with the quartz glass blank 1 contained therein to such an extent that the quartz glass is softened and flows out under the action of its own weight into the mold, thereby filling said mold. At the same time the ram resting thereon deforms the top side of the soft quartz glass mass so that a recess with a concave shape is formed.

The quartz glass blank 1 is first heated to 1350° C. and then heated with a ramp of 9° C./min to 1700° C. and then with a ramp of 2° C./min to a temperature of 1780° C. At this temperature the quartz glass mass is held for about 15 minutes. It is lowered in this process into the mold and the ram is simultaneously pressed in.

The inner form of the graphite mold bottom and the outer form of the ram resting thereon and pressed therein yield the convex-concave form of the preform 6, as is schematically shown in FIG. 2.

The layers extending in plane-parallel fashion in the cylindrical quartz glass blank 1 are shaped in the lens-shaped preform 6 such that they follow the convex external form 7 and the concave external form 8 of the lens at least in part. The layers extend not in parallel with each other, but tend to nestle against the edge of the preform 6. This prevents the layers 3 from ending on the surface at an obtuse angle, as is known from the prior art. In the intended use of the optical lens obtained from the preform the angle between the direction of the passing light and the layers 3 is around 90 degrees, and it is at least greater than it would be if the layers extended in plane-parallel fashion, as is recommended in the prior art as mentioned at the outset.

The surface normal to the layers extends over the whole surface extension thereof in the optically effective area at an angle between 80° and 100° relative to both curved surfaces.

A lens 9 with a weight of 9 kg, a diameter of 250 mm and a maximum thickness of 90 mm is obtained from the preform 6 by removing an oversize and by mechanical finishing and grinding of the sides 10 for the purpose of encasement. The optically effective area conforms to the remaining curved lens surfaces 7, 8.

The lens 9 is used in a microlithographic projection system in such a manner that the existing layers extend as perpendicular as possible to the direction of the passing light or, in other words, that the angle of the direction of the passing light to the surface normal of the layers is as small as possible.

The invention claimed is:

1. A method for producing a meniscus lens from synthetic quartz glass for use in a microlithography apparatus, said lens having a first optical surface and a second optical surface with a direction of curvature the same as a direction of curvature of the first optical surface, said method comprising:

forming $SiO_2$ particles by oxidation or flame hydrolysis of a silicon-containing starting compound; and depositing said $SiO_2$ particles layer by layer on a substrate so as to form a cylindrical $SiO_2$ blank that contains layers with a surface normal extending in a growing direction, wherein the blank is plastically worked in a hot forming process under the effect of a deforming force so as to form a preform that includes at least the first curved surface and in which the layers are curved in the direction of curvature, and obtaining the meniscus lens from the preform.

2. The method according to claim 1, wherein the hot forming process comprises a forming step in which the blank is accommodated in a lathe, softened and shaped without tools so as to obtain the preform.

3. The method according to claim 2, wherein the meniscus lens is obtained by machining the second surface or by a press ram operative in the direction of the layer surface normals.

4. The method according to claim 1, wherein the hot forming process comprises a forming step in which the blank is accommodated using a blowpipe, softened and formed in a graphite mold so as to obtain the preform.

5. The method according to claim 1, wherein the hot forming process comprises a forming step in which the blank is softened in a furnace and flows out into a graphite mold so as to form the preform.

6. The method according to claim 5, wherein the graphite mold has an arched bottom side that produces the first curved surface, and the second curved surface is produced by plastic preform using an arched body acting on the blank in the direction of the layer surface normals.

7. The method according to claim 1, wherein one of the layers is adjacent the first curved surface and has a surface, the surface normal to said surface over the whole surface is at an angle between 70° and 110° to the first curved surface.

8. The method according to claim 7, wherein the surface normal extends at an angle between 80° and 100° to the first curved surface.

\* \* \* \* \*